US009167461B2

United States Patent
Rácz et al.

(10) Patent No.: US 9,167,461 B2
(45) Date of Patent: Oct. 20, 2015

(54) METHOD FOR HANDLING USER CONSENT FOR MDT DATA COLLECTION

(71) Applicant: Telefonaktiebolaget L M Ericsson (publ), Stockholm (SE)

(72) Inventors: András Rácz, Budapest (HU); Robert Petersen, Linköping (SE)

(73) Assignee: Telefonaktiebolaget L M Ericcson (publ), Stockholm (SE)

(*) Notice: Subject to any disclaimer, the term of this patent is extended or adjusted under 35 U.S.C. 154(b) by 0 days.

(21) Appl. No.: 14/431,795

(22) PCT Filed: Jun. 7, 2013

(86) PCT No.: PCT/EP2013/061807
§ 371 (c)(1),
(2) Date: Mar. 27, 2015

(87) PCT Pub. No.: WO2014/048591
PCT Pub. Date: Apr. 3, 2014

(65) Prior Publication Data
US 2015/0249932 A1    Sep. 3, 2015

Related U.S. Application Data

(60) Provisional application No. 61/706,392, filed on Sep. 27, 2012.

(51) Int. Cl.
| H04L 1/00 | (2006.01) |
| H04W 24/08 | (2009.01) |
| H04W 24/10 | (2009.01) |

(52) U.S. Cl.
CPC .............. H04W 24/08 (2013.01); H04W 24/10 (2013.01)

(58) Field of Classification Search
CPC .............................. H04W 24/08; H04W 24/10
See application file for complete search history.

(56) References Cited

U.S. PATENT DOCUMENTS

2010/0217794 A1*   8/2010   Strandell et al. ............... 709/203
2012/0208503 A1*   8/2012   Johansson ..................... 455/411

(Continued)

FOREIGN PATENT DOCUMENTS

WO    2012110100 A1   8/2012

OTHER PUBLICATIONS

3GPP, "3rd Generation Partnership Project; Technical Specification Group Services and System Aspects; Telecommunication management; Configuration Management (CM); Core network resources Integration Reference Point (IRP); Network Resource Model (NRM) (Release 11)", 3GPP TS 32.632 V11.0.0, Sep. 2012, 1-54.

(Continued)

*Primary Examiner* — Clemence Han
(74) *Attorney, Agent, or Firm* — Murphy, Bilak & Homiller, PLLC

(57) ABSTRACT

According to an aspect of the present invention, a method of operating a NE network node of a communication network is provided, the network node being connected via the communication network to at least one user device. The method comprises: receiving a request at the NE network node to carry out a MDT measurement for one of the at least one user device; determining, at the NE network node, whether carrying out the MDT measurement or processing or reporting a result of the MDT measurement requires a user consent, based on data of a MDT privacy matrix; determining, at the NE network node, whether a consent indicator which is assigned to the user device indicates allowance to carry out the MDT measurement, or indicates allowance of processing or reporting the result of the MDT measurement if the MDT privacy matrix indicates that a user consent is necessary; and carrying out the MDT measurement at the NE network node and/or processing the result of the MDT measurement and/or reporting the result of the MDT measurement to a further network node of the communication network if the consent indicator indicates that the MDT measurement can be carried out or the result of the MDT measurement can be processed or reported.

22 Claims, 9 Drawing Sheets

(56) References Cited

U.S. PATENT DOCUMENTS

| | | | |
|---|---|---|---|
| 2013/0077517 A1* | 3/2013 | Cho et al. | 370/252 |
| 2013/0114446 A1* | 5/2013 | Liu et al. | 370/252 |
| 2013/0114454 A1* | 5/2013 | Hwang et al. | 370/252 |
| 2013/0178211 A1* | 7/2013 | Wang et al. | 455/436 |
| 2013/0223233 A1* | 8/2013 | Zhao et al. | 370/241.1 |
| 2013/0324106 A1* | 12/2013 | Bodog | 455/422.1 |
| 2014/0024366 A1* | 1/2014 | Bodog et al. | 455/432.1 |
| 2014/0043982 A1* | 2/2014 | Bodog et al. | 370/242 |
| 2014/0045493 A1* | 2/2014 | Hapsari et al. | 455/432.1 |
| 2014/0051428 A1* | 2/2014 | Jung et al. | 455/422.1 |
| 2014/0052871 A1* | 2/2014 | Andrianov et al. | 709/229 |
| 2014/0066021 A1* | 3/2014 | Takahashi et al. | 455/411 |
| 2014/0140326 A1* | 5/2014 | Zhang | 370/331 |
| 2014/0155056 A1* | 6/2014 | Jactat et al. | 455/422.1 |
| 2014/0161111 A1* | 6/2014 | Kim et al. | 370/336 |
| 2014/0194109 A1* | 7/2014 | Nunzi et al. | 455/418 |
| 2014/0248868 A1* | 9/2014 | Wang et al. | 455/422.1 |
| 2014/0286240 A1* | 9/2014 | Kim et al. | 370/328 |
| 2014/0349583 A1* | 11/2014 | Bodog et al. | 455/67.11 |
| 2014/0357297 A1* | 12/2014 | Futaki | 455/456.1 |
| 2015/0065083 A1* | 3/2015 | Racz et al. | 455/405 |
| 2015/0109939 A1* | 4/2015 | Schmidt et al. | 370/252 |
| 2015/0117238 A1* | 4/2015 | Kronestedt et al. | 370/252 |

OTHER PUBLICATIONS

3GPP, "3rd Generation Partnership Project; Technical Specification Group Services and System Aspects; Telecommunication management; Configuration Management (CM); UTRAN network resources Integration Reference Point (IRP); Network Resource Model (NRM) (Release 11)", 3GPP TS 32.642 V11.4.0, Dec. 2012, 1-50.

3GPP, "3rd Generation Partnership Project; Technical Specification Group Services and System Aspects; Telecommunication management; Evolved Packet Core (EPC) Network Resource Model (NRM) Integration Reference Point (IRP); Information Service (IS) (Release 11)", 3GPP TS 32.752 V11.0.0, Sep. 2012, 1-26.

3GPP, "3rd Generation Partnership Project; Technical Specification Group Services and System Aspects; Telecommunication management; Evolved Universal Terrestrial Radio Access Network (E-UTRAN) Network Resource Model (NRM) Integration Reference Point (IRP); Information Service (IS) (Release 11)", 3GPP TS 32.762 V11.5.0, Mar. 2013, 1-59.

3GPP, "3rd Generation Partnership Project; Technical Specification Group Services and System Aspects; Telecommunication management; Principles and high level requirements (Release 11)", 3GPP TS 32.101 V11.1.0, Dec. 2012, 1-67.

3GPP, "3rd Generation Partnership Project; Technical Specification Group Services and System Aspects; Telecommunication management; Subscriber and equipment trace; Trace concepts and requirements (Release 11)", 3GPP TS 32.421 V11.6.0, Mar. 2013, 1-38.

3GPP, "3rd Generation Partnership Project; Technical Specification Group Services and System Aspects; Telecommunication management; Subscriber and equipment trace; Trace control and configuration management (Release 11)", 3GPP TS 32.422 V11.5.0, Sep. 2012, 1-124.

* cited by examiner (a) Configuration phase (only in case of CM IRP based embodiment)

(b) UE selection phase (covering all embodiments)

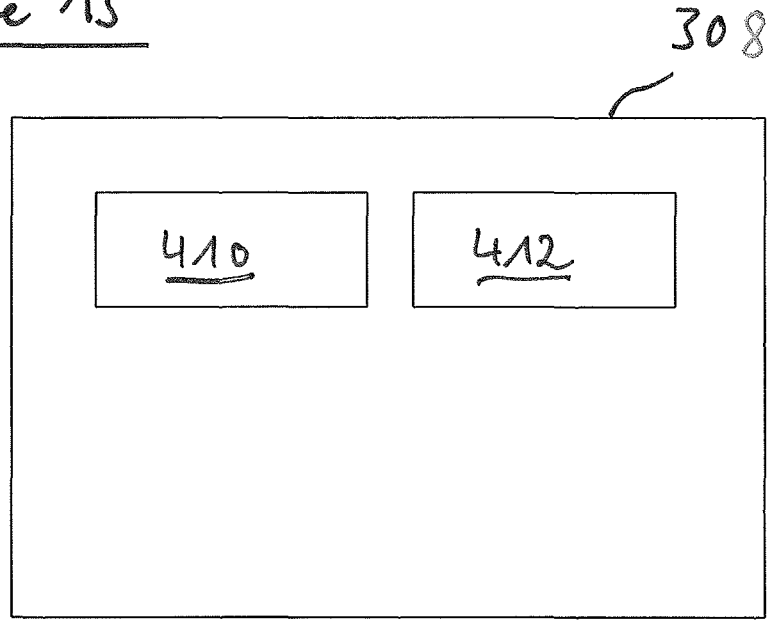
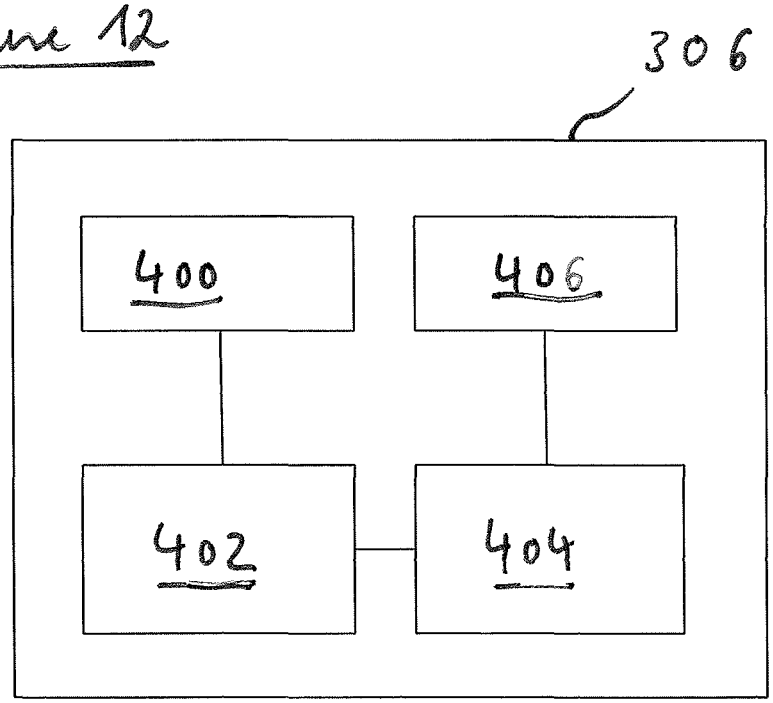

METHOD FOR HANDLING USER CONSENT FOR MDT DATA COLLECTION

TECHNICAL FIELD

The present invention relates generally to Minimization of Drive Testing (MDT), and more particularly relates to a method and apparatus for reporting MDT measurements based upon a predefined MDT privacy matrix.

BACKGROUND

Drive testing has been used as a method to measure and assess network coverage and capacity for network optimization. Drive testing involves the use of a motor vehicle that moves throughout a wireless coverage area while equipped to record a variety of measurements in a wireless communication network, and/or to submit dummy data to the network so that measurements may be performed by the network.

More recently, so-called "Minimization of Drive Testing" (MDT) efforts have been initiated to minimize such drive testing, as such testing has some inherent inefficiency including fuel consumption and carbon emissions. Additionally, drive testing utilizes dummy data, which is less useful than actual user data. Through MDT efforts, individual mobile stations are used to harvest measurements that would otherwise be obtained or facilitated by a drive tester.

A standardized solution exists for Minimization of Drive Test (MDT) data collection as specified in 3GPP TS 32.422 and related specifications in a cellular system which has a management architecture as shown in FIG. 1 (from 3GPP TS 32.101). MDT is specified for Universal Mobile Telecommunication System (UMTS) and Long Term Evolution (LTE) systems in 3GPP.

The data collection for MDT functions is ordered over the Itf-N interface (see interface number 2 in FIG. 1) from a Network Manager (NM) to a Domain Manager/Element Manager (DM/EM), which in its turn orders the Network Element (NE) to perform the MDT data collection according to the request coming from the NM. The MDT data collection can be ordered from NM using the trace functionality as specified in TS 32.422. The MDT data collection can be ordered for a specific subscriber or terminal, identified by IMSI/IMEI (also called "signaling based MDT trace") or for a specific area, i.e., set of cells (also called "area based MDT" or "management based trace").

As some of the data collected during an MDT session may be sensitive from a privacy point of view, a user consent indicator is configured per subscriber in the Horne Subscriber Server (HSS) or Home Location Register (HLR). The user consent indicator is propagated in the signaling control chain (interface 6 in FIG. 1) to the NE (in case of signaling based MDT trace) or via the management interface from DM to the NE (interface 1 in FIG. 1), (in case of management based MDT). The NE carries out the selection of UEs that should participate in the MDT data collection.

When a MDT data collection order (trace order configuration) is received in the NE, it checks for sessions that fulfill the criteria from the MDT order. When such a session is found, the NE checks the user consent indicator for that session. Only if the user consent is set to permit measurements is MDT collection allowed, and the NE starts the MDT data collection for that session.

There are different types of MDT, including the following:
(1) Area based MDT: The MDT order is for a specified area typically for a cell or list of cells.
(2) Signaling based MDT: The MDT order is for a specified user (IMSI) or User Equipment (UE identified by IMEI(SV)).
(3) Logged MDT: The MDT data collection is done for UEs that are in idle mode.
(4) Immediate MDT: The MDT data collection is done for UEs that are in active mode.

Types 1 and 2 are mutually exclusive, as are types 3 and 4. However, type 1 may be combined with type 3 or 4, and similarly type 2 may be combined with type 3 or 4.

There can be several user functions on the NM that uses MDT data collection (e.g., automated functions for finding coverage holes, statistic collection functions, advanced fault localization functions). Some of them make the collected data accessible to 3rd party tools and/or humans.

The current standard solution of user consent and privacy handling for MDT measurement collection is based on the one bit user consent indicator stored as part of subscription data in HSS or HLR. This one bit indicator is sent to the network when the UE establishes connection and it is used by the network to decide whether the given UE is eligible for MDT data collection or not.

The one bit indicator does not allow making any distinction regarding the need for user consent depending on the type of data that is collected, on the use case for which the data is collected, on the differences in operator policy or local regulations in user privacy handling. That is, always the worst case has to be assumed when setting the user consent indicator, i.e., that even privacy sensitive data might be collected (e.g., GPS coordinates). This results in a conservative setting of the user consent indicator, which limits data collection and use cases based on MDT, and limits the value of the user functions built on MDT data.

SUMMARY

According to an aspect of the present invention, a method of operating a Network Element (NE) network node of a communication network is provided, the network node being connected via the communication network to at least one user device. The method comprises receiving a request at the NE network node to carry out a MDT measurement for one of the at least one user device. The method further comprises determining, at the NE network node, whether carrying out the MDT measurement or processing or reporting a result of the MDT measurement requires a user consent, based on data of a MDT privacy matrix. The method further comprises determining, at the NE network node, whether a consent indicator which is assigned to the user device indicates allowance to carry out the MDT measurement, or indicates allowance of processing or reporting the result of the MDT measurement if the MDT privacy matrix indicates that user consent is necessary. The method also comprises carrying out the MDT measurement at the NE network node and/or processing the result of the MDT measurement and/or reporting the result of the MDT measurement to a further network node of the communication network if the consent indicator indicates that the MDT measurement can be carried out or the result of the MDT measurement can be processed or reported.

The privacy matrix may also be referred to as privacy indicator matrix.

The method may further comprise not carrying out the MDT measurement, or carrying out the MDT measurement, however not processing or reporting a result of the MDT measurement to the further network node if the consent indicator indicates that the MDT measurement cannot be carried out or that the result of the MDT measurement cannot be processed or reported.

An advantage of such a method is that it is possible to implement any privacy management policy in an operator's network with regards to collection of MDT data. Thereby, it becomes possible to consider the type of data that is collected, the use case for which the data is collected, the country specific and operator specific data privacy policies. The solution provides a backward compatible extension (i.e., the one bit user consent indicator is preserved and extended with the privacy matrix).

The communication network may comprise at least one Network Manager (NM) network node, and at least one Domain Manager (DM) network node, wherein the at least one NM network node is connected to the at least one DM network node, and the at least one DM network node is connected to the NE network node.

The MDT privacy matrix may be transferred from one of the at least one NM network node to the NE network node. In this way, the MDT privacy matrix can be generated and distributed in a transparent, centralized manner.

The consent indicator assigned to the user device may be transferred from a consent network node storing consent indicators for the at least one user devices to the NE network node, or may be transferred from the user device to the NE network node. In this way, it is possible to decouple consent indicator information and MDT privacy matrix information from each other which ensures privacy.

The result of the MDT measurement may be sent from the NE network node to the NM network node. In this way, results of the MDT measurements can be processed and handled in a transparent, centralized manner.

The MDT privacy matrix may be transferred from one of the at least one NM network node to the NE network node via one of the at least one DM network node, wherein the result of the MDT measurement is sent from the NE network node to the NM network node via one of the at least one DM network node.

The method may further comprise: receiving a request at the NE network node to carry out a plurality of MDT measurements for the user device; based on the MDT privacy matrix, determining a first set of MDT measurements for which user consent is required, and a second set of MDT measurements for which user consent is not required; including, if the consent indicator indicates that the user device user allows to carry out MDT measurements and to process/report a result of the MDT measurements, the first set and the second set of MDT measurements into a MDT reporting set assigned to the user device; including, if the consent indicator indicates that the user device user does not allow to carry out MDT measurements or does not allow to process/report the result of the MDT measurements, only the second set of MDT measurements the MDT reporting set; and transmitting the MDT reporting set to the further network node. In this way, all MDT measurements can be carried out in advance which increases the responding time when MDT measurements are actually requested from the NM network node.

The MDT privacy matrix may comprise at least one pair of a MDT measurement entry which indicates a MDT measurement to be carried out, and a consent indicator entry which indicates whether the MDT measurement requires user consent or not.

Each MDT measurement entry of the MDT privacy matrix may comprise an arbitrary number of data units. For example, it may comprise at least one of the following data units: information specifying how the MDT measurement is to be carried out, and information specifying how the collected data is intended to be used or processed.

A variety of already existing network functionality may be used in order to provide the MDT privacy matrix from the NM network node to the NE network node. For example, this may be done via an Itf interface and during a configuration process of the NE network node using Configuration Management IRP. The MDT privacy matrix may also be provided as a part of ENBFunction Information Object Class, IOC, information or of a RncFunction IOC information or of a SgsnFunction IOC information or of a MmeFunction IOC information which is transferred from the NM network node to the NE network node via the Itf interface, respectively. Further, the MDT privacy matrix may be provided from the NM network node to the NE network node via an Itf interface and as a part of the request received at the NE network node to carry out the MDT measurement using Trace IRP.

The user device may for example be a wireless terminal wirelessly connected to the NE network node. However, also terminals connected to the NE network node by cable may be used.

According to an aspect of the present invention, a method of operating a NM network node of a communication network is provided, the network node being connected via the communication network to a NE network node, the NE network node being connected to at least one user device. The method comprises: receiving or generating, at the NM network node, a MDT privacy matrix indicating whether carrying out a MDT measurement or processing or reporting a result of the MDT measurement for a user device requires a user consent. The method further comprises transmitting the MDT privacy matrix to the NE network node and receiving MDT measurement data for the user device collected by the NE network node based on data of the MDT privacy matrix and based on a consent indicator assigned to the user device which indicates allowance to carry out the MDT measurement, and/or indicates allowance of processing or reporting the result of the MDT measurement to the NM network node.

According to an aspect of the present invention, a method of operating a communication network comprising a NM network node and a NE network node is provided, the NM network node being connected via the communication network to the NE network node, and the NE network node being connected to at least one user device. The method comprises: receiving or generating, at the NM network node, a MDT privacy matrix indicating whether carrying out a MDT measurement or processing or reporting a result of the MDT measurement for a user device requires a user consent; transmitting the MDT privacy matrix to the NE network node; receiving a request at the NE network node to carry out a MDT measurement for one of the at least one user devices; determining, at the NE network node, whether carrying out the MDT measurement or processing or reporting a result of the MDT measurement requires a user consent, based on data of the MDT privacy matrix; determining, at the NE network node, whether a consent indicator which is assigned to the user device indicates allowance to carry out the MDT measurement, or indicates allowance of processing or reporting the result of the MDT measurement if the MDT privacy matrix indicates that a user consent is necessary; carrying out the MDT measurement at the NE network node and/or processing the result of the MDT measurement and/or reporting the result of the MDT measurement to the NM network node if the consent indicator indicates that the MDT measurement can be carried out or the result of the MDT measurement can be processed or reported.

The method may further comprise not carrying out the MDT measurement, or carrying out the MDT measurement, however not processing or reporting a result of the MDT measurement to the NM network node if the consent indicator indicates that the MDT measurement cannot be carried out or that the result of the MDT measurement cannot be processed or reported.

The method may further comprise: receiving a request at the NE network node to carry out a plurality of MDT measurements for the user device; based on the MDT privacy matrix, determining a first set of MDT measurements for which user consent is required, and a second set of MDT measurements for which user consent is not required; including, if the consent indicator indicates that the user device user allows to carry out MDT measurements and to process/report a result of the MDT measurements, the first set and the second set of MDT measurements into a MDT reporting set assigned to the user device; including, if the consent indicator indicates that the user device user does not allow to carry out MDT measurements or does not allow to process/report the result of the MDT measurements, only the second set of MDT measurements the MDT reporting set; and transmitting the MDT reporting set to the NM network node.

According to an aspect of the present invention, a computer program product is provided comprising program code portions for performing the steps of any one of the embodiment of the present invention when the computer program product is executed on one or more computing devices.

The computer program product may be stored on a computer-readable recording medium.

According to an aspect of the present invention, a NE network node of a communication network is provided, the network node being connectable via the communication network to at least one user device. The NE network node comprises: a receiving unit configured to receive a request at the NE network node to carry out a MDT measurement for one of the at least one user devices; a processing unit connected to the receiving unit and configured to determine whether carrying out the MDT measurement or processing or reporting a result of the MDT measurement requires a user consent, based on data of a MDT privacy matrix, the processing unit being further configured to determine whether a consent indicator which is assigned to the user device indicates allowance to carry out the MDT measurement, or indicates allowance of processing or reporting the result of the MDT measurement if the MDT privacy matrix indicates that a user consent is necessary; a measurement unit connected to the processing unit and configured to carry out the MDT measurement and/or to process the result of the MDT measurement and/or report the result of the MDT measurement to a further network node of the communication network if the consent indicator indicates that the MDT measurement can be carried out or the result of the MDT measurement can be processed or reported; and a sending unit configured to send the result of the MDT measurement to the further network node of the communication network.

The measurement unit may be further configured to not carry out the MDT measurement, or carry out the MDT measurement, however not process or report a result of the MDT measurement to the further network node if the consent indicator indicates that the MDT measurement cannot be carried out or that the result of the MDT measurement cannot be processed or reported.

According to an aspect of the present invention, a NM network node of a communication network is provided, the NM network node being connectable via the communication network to a NE network node. The NM network node comprises: a transmitting unit configured to transmit a MDT privacy matrix generated or received at the NM network node to the NE network node, the MDT privacy matrix indicating whether carrying out a MDT measurement or processing or reporting a result of the MDT measurement for a user device requires a user consent; and a receiving unit configured to receive MDT measurement data for the user device collected by the NE network node based on data of the MDT privacy matrix and based on a consent indicator assigned to the user device which indicates allowance to carry out the MDT measurement, and/or indicates allowance of processing or reporting the result of the MDT measurement to the NM network node.

According to one or more embodiments, a method of reporting MDT measurements to a NM network node in a wireless communication network is disclosed, with the method being implemented by a NE network node. The NE network node obtains a consent indicator and a predefined MDT privacy matrix for a reporting wireless terminal. Based on the privacy matrix, the NE network node determines a first set of MDT measurements for which user consent is required, and a second set of MDT measurements for which user consent is not required. If the consent indicator indicates that the reporting wireless terminal authorizes full MDT reporting, the NE network node includes the first and second sets of MDT measurements in a MDT reporting set for the wireless terminal. If the consent indicator indicates that the reporting wireless terminal prohibits full MDT reporting, the NE network node includes only measurements from the second set of MDT measurements in the MDT reporting set.

In the same or another embodiment, the NE network node generates an MDT report that includes MDT measurement values for the various measurements in the MDT reporting set, and transmits the MDT report to the NM network node.

In one embodiment the obtaining includes receiving the consent indicator from one of a Home Subscriber Server (HSS) or a Home Location Register (HLR), and receiving the predefined MDT privacy matrix from the NM network node. In the same or another embodiment, the predefined MDT privacy matrix is received from the NM network node via a Trace Job message or a MDT Configuration Management Information Object Class (IOC) message (e.g., through an Itf-N interface). Thus, in these embodiments, the privacy matrix can be configured in the NE network node as a node configuration or as a trace configuration.

In one example embodiment, the wireless communication network is a UMTS network, and the NE is a Radio Network Controller (RNC) or a Serving GPRS Support Node (SGSN). In another example embodiment, the wireless communication network is a Long Term Evolution (LTE) network, and the NE network node is an eNodeB or a Mobility Management Entity (MME). A corresponding NE network node operative to implement one or more of the embodiments of the method described above is also disclosed.

The configurable MDT privacy matrix specifies for the whole network for what MDT measurements user consent is required and for what measurements user consent is not required. The user consent indicator is then used by the NE network node only to verify whether measurements requiring user consent are permitted. The privacy matrix can be set according to the operator policy, the use case for which data is collected, etc., and it can be downloaded to the network elements either with node configuration or with the MDT trace configuration, for example.

BRIEF DESCRIPTION OF THE DRAWINGS

Of course, the present invention is not limited to the above features and advantages. Indeed, those skilled in the art will recognize additional features and advantages upon reading the following detailed description, and upon viewing the accompanying drawings.

FIG. 12 illustrates an example NE network node.

FIG. 13 illustrates an example NE network node.

DETAILED DESCRIPTION

In the following description, for purposes of explanation and not limitation, specific details are set forth, such as specific device and system configurations and specific methods, steps and functions, in order to provide a thorough understanding of the technique presented herein. It will be appreciated that this technique may be practiced in other embodiments that depart from these specific details.

Those skilled in the art will further appreciate that the methods, steps and functions described herein may be implemented using individual hardware circuitry, using software functioning in conjunction with a programmed microprocessor or general purpose computer, using one or more Application Specific Integrated Circuits (ASICs), one or more DSPs and/or one or more Field Programmable Gate Arrays (FPGAs). It will also be appreciated that the technique disclosed herein may be embodied in a processor and a memory coupled to the processor, wherein the memory stores one or more programs that perform the methods, steps and functions described herein when executed by the processor.

Figure 9:
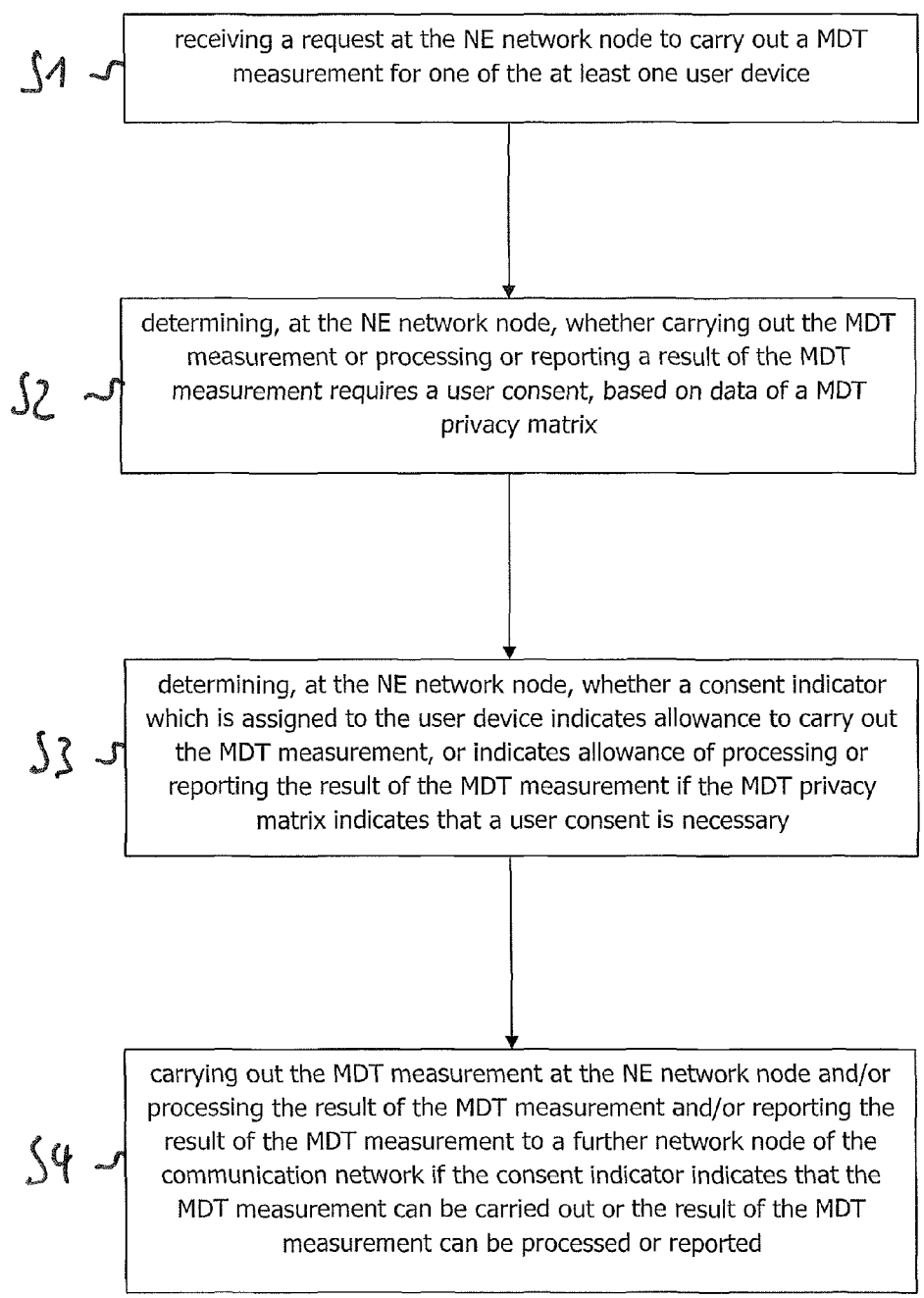
FIG. 9 illustrates an example method of operating a NE network node.

FIG. 9 shows an embodiment of a method of operating a NE network node of a communication network, the network node being connected via the communication network to at least one user device. At S1, a request is received at the NE network node to carry out a MDT measurement for one of the at least one user device. At S2, it is determined, at the NE network node, whether carrying out the MDT measurement or processing or reporting a result of the MDT measurement requires a user consent, based on data of a MDT privacy matrix. At S3 it is determined, at the NE network node, whether a consent indicator which is assigned to the user device indicates allowance to carry out the MDT measurement, or indicates allowance of processing or reporting the result of the MDT measurement if the MDT privacy matrix indicates that a user consent is necessary. At S4, the MDT measurement is carried out at the NE network node and/or processing the result of the MDT measurement and/or reporting the result of the MDT measurement to a further network node of the communication network if the consent indicator indicates that the MDT measurement can be carried out or the result of the MDT measurement can be processed or reported.

Figure 10:
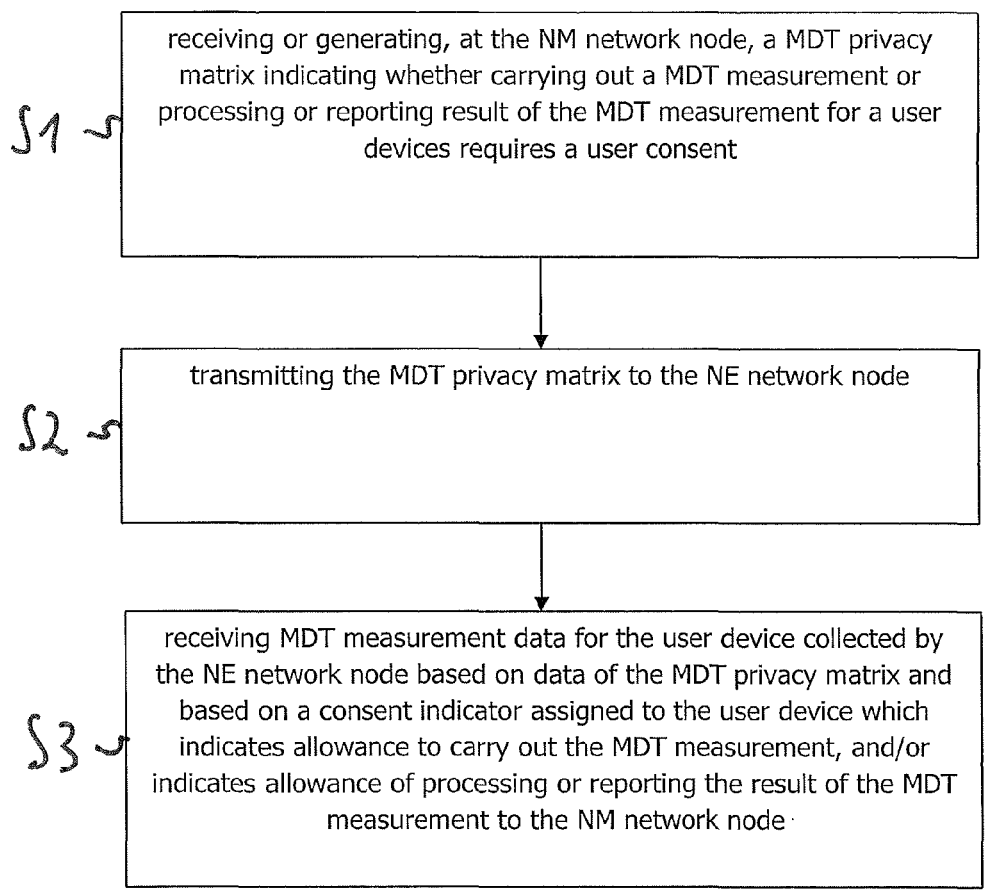
FIG. 10 illustrates an example method of operating a NM network node.

FIG. 10 shows an embodiment of a method of operating a NM network node of a communication network, the network node being connected via the communication network to a NE network node, the NE network node being connected to at least one user device. At S1, at the NM network node, a MDT privacy matrix is received or generated indicating whether carrying out a MDT measurement or processing or reporting a result of the MDT measurement for a user device requires a user consent. At S2, the MDT privacy matrix is transmitted to the NE network node. At S3, MDT measurement data is received for the user device collected by the NE network node based on data of the MDT privacy matrix and based on a consent indicator assigned to the user device which indicates allowance to carry out the MDT measurement, and/or indicates allowance of processing or reporting the result of the MDT measurement to the NM network node.

Figure 11:
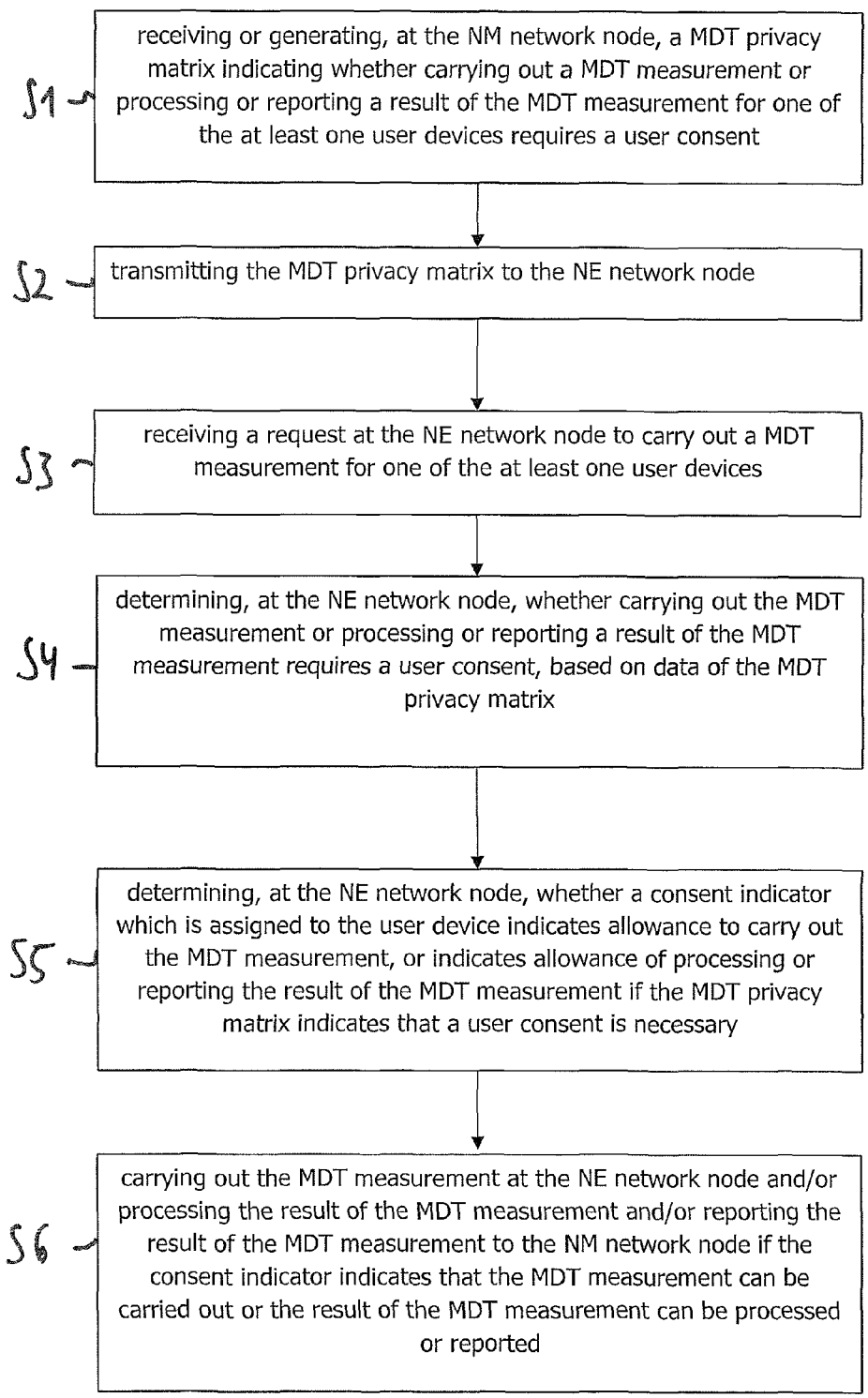
FIG. 11 illustrates an example method of operating a communication network comprising a NM network node and a NE network node.

Based on the embodiments shown in FIGS. 9 and 10, an embodiment of a method of operating a communication network comprising a NM network node and a NE network node is provided which is shown in FIG. 11, the NM network node being connected via the communication network to the NE network node, and the NE network node being connected to at least one user device. At S1, at the NM network node, a MDT privacy matrix is received or generated, indicating whether carrying out a MDT measurement or processing or reporting a result of the MDT measurement for one of the at least one user devices requires a user consent. At S2, the MDT privacy matrix is transmitted to the NE network node. At S3, a request is received at the NE network node to carry out a MDT measurement for one of the at least one user devices. At S4, at the NE network node, it is determined whether carrying out the MDT measurement or processing or reporting a result of the MDT measurement requires a user consent, based on data of the MDT privacy matrix. At S5, it is determined at the NE network node whether a consent indicator which is assigned to the user device indicates allowance to carry out the MDT measurement, or indicates allowance of processing or reporting the result of the MDT measurement if the MDT privacy matrix indicates that a user consent is necessary. At S6, the MDT measurement is carried out at the NE network node and/or processing the result of the MDT measurement and/or reporting the result of the MDT measurement to the NM network node if the consent indicator indicates that the MDT measurement can be carried out or the result of the MDT measurement can be processed or reported.

In order to carry out the method described in FIGS. 9 and 11, a NE network node 306 as shown in FIG. 12 may be used. The network node 306 is connectable via the communication network to at least one user device. The NE network node 306 comprises a receiving unit 400 configured to receive a request at the NE network node to carry out a MDT measurement for one of the at least one user devices. The NE network node 306 further comprises a processing unit 402 connected to the receiving unit 400 and configured to determine whether carrying out the MDT measurement or processing or reporting a result of the MDT measurement requires a user consent, based on data of a MDT privacy matrix, the processing unit 402 being further configured to determine whether a consent indicator which is assigned to the user device indicates allowance to carry out the MDT measurement, or indicates allowance of processing or reporting the result of the MDT measurement if the MDT privacy matrix indicates that a user consent is necessary. Further, the NE network node 306 comprises a measurement unit 404 connected to the processing unit 402 and configured to carry out the MDT measurement and/or to process the result of the MDT measurement and/or report the result of the MDT measurement to a further network node of the communication network if the consent indicator indicates that the MDT measurement can be carried out or the result of the MDT measurement can be processed or reported. Also, a sending unit 406 connected to the measurement unit 404 and configured to send the result of the MDT measurement to the further network node of the communication network is provided.

In order to carry out the method described in FIGS. 10 and 11, a NM network node 308 as shown in FIG. 13 may be used. FIG. 13 shows a NM network node 308 of a communication network, the NM network node 308 being connectable via the communication network to a NE network node 306. The NM network node comprises a transmitting unit 410 configured to transmit a MDT privacy matrix generated or received at the NM network node 308 to the NE network node 306, the MDT privacy matrix indicating whether carrying out a MDT measurement or processing or reporting a result of the MDT measurement for one of the at least one user devices requires a user consent. The NM network node 308 further comprises a receiving unit 412 configured to receive MDT measurement data for the user device collected by the NE network node 306 based on data of the MDT privacy matrix and based on a consent indicator assigned to the user device which indicates allowance to carry out the MDT measurement, and/or indicates allowance of processing or reporting the result of the MDT measurement to the NM network node 308.

Figure 1:
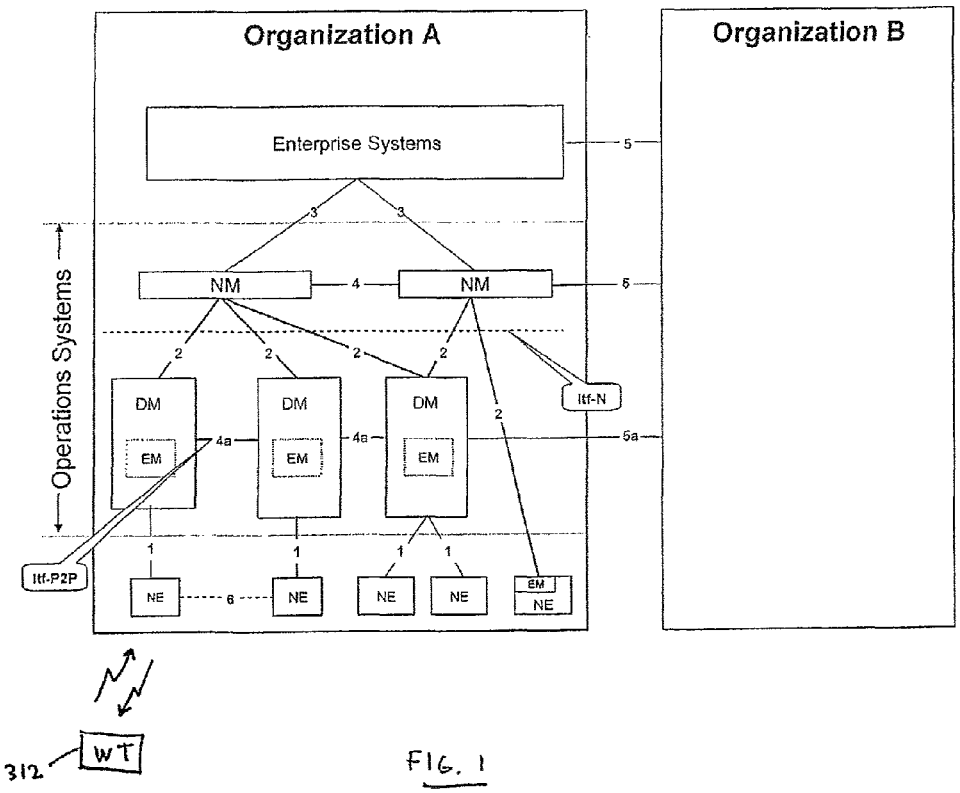
FIG. 1 is a block diagram of one embodiment of an example MDT architecture.
Figure 2:
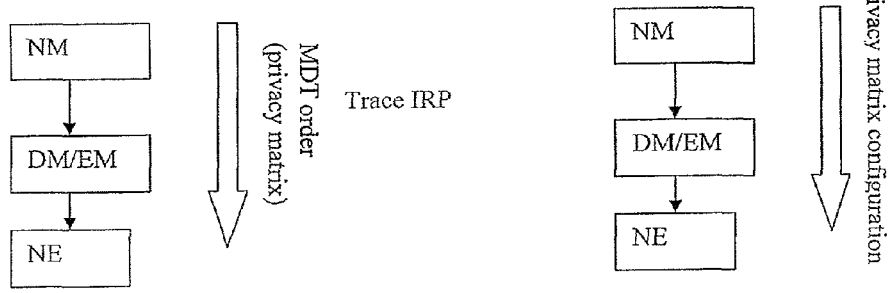
FIG. 2 illustrates an example privacy matrix distribution via a Trace IRP on the Itf-N interface.
Figure 3:
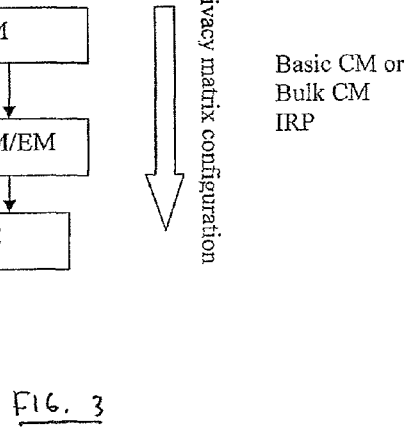
FIG. 3 illustrates an example privacy matrix distribution via CM IRP on the Itf-N interface.

The communication network comprising the NE network node 306 and the NM network node 308 may have the structure as shown in FIG. 1.

Referring to FIG. 1, an example MDT architecture is shown. In one or more embodiments, the "Organizations" are network operators, the "Enterprise Systems" are business systems (e.g., advertising, billing, inventory, etc.) that are related to OAM (Operations and Management). In these one or more embodiments, the NM network nodes 308 correspond to a network operation center where OAM is performed. The DM nodes are computers that manage network components, such as several Radio Network Controllers (RNCs) or eNodeBs. The EMs (shown in dotted lines) may be part of a DM node or a NE network node 306, and are used to process received commands (e.g. from the NM network node 308 or from an operator technician). One or more wireless terminals (WTs) 312 are in communication with the NE network nodes 306.

A privacy matrix is used by the NM network nodes 308 to indicate for each MDT measurement (or for group of MDT measurements per category) whether the collection of that measurement requires user consent in that particular network or in that particular MDT trace job (privacy indicator=1) or the measurement can be collected even without user consent (privacy indicator=0).

In the simplest case the privacy matrix may have the format of below Table 1. (In a particular realization of the privacy matrix, there may be only one entry for a group of measurements that have the same privacy implications.) Similarly in a particular realization, the privacy matrix may include an entry for only those measurements that require user consent and the ones not included in the matrix, it would implicitly mean there is no need for user consent. Thus, based on the privacy matrix, the NE network node 306 determines a first set of MDT measurements for which user consent is required, and a second set of MDT measurements for which user consent is not required (and the first set may be explicitly indicated in the matrix or may be implicitly determined from the matrix).

TABLE 1

| MDT measurement | Privacy indicator (0: user consent not needed) (1: user consent needed) |
|---|---|
| M1: (RSPP/RSRQ) | 0 |
| M2: (SINR) | 0 |
| M3: (scheduled throughput) | 0 |
| M4: (transmitted volume) | 0 |
| M5: (GPS reporting) | 1 |
| ... | |

The privacy matrix can be provided over Itf-N either as part of Configuration Management (CM) IRPs (Integration Reference Points) or as part of MDT trace configuration IRP and then propagated to NE network nodes 306 (see FIG. 1).

The network element (e.g., eNodeB, RNC, SGSN, MME) may perform the following steps before activating an MDT measurement collection for a particular UE:

For each UE in the cell (in case of management based MDT) or for the selected UE (in case of IMSI/IMEI(SV) based MDT) it checks for each measurement Mx that are requested in the MDT trace configuration:

FOR EACH UEy:
     FOR EACH Measurement Mx in the MDT Trace configuration:
       IF (privacyIndicator(Mx)==1 AND userConsent(UEy)==1) OR privacyIndicator(Mx)=0 THEN Start measurement Mx for that UE
       ELSE DO NOT Start measurement Mx for UEy A possible realization of this approach is described in more detail in FIGS. 4A and 4B.

Figure 4A:
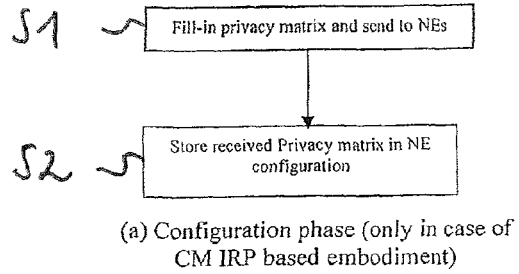
FIGS. 4*a-b* illustrate MDT example privacy matrix processing methods.
Figure 5:
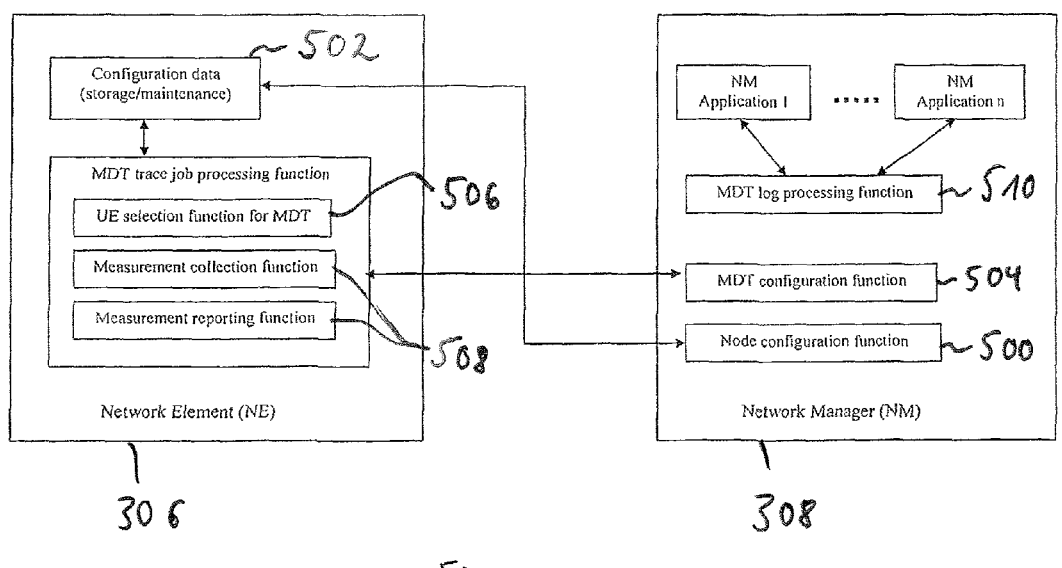
FIG. 5 is a block diagram of a NE network node and a NM network node.

In FIG. 4A, at S1, a MDT privacy matrix is generated (e.g. at a NM network node 308) and sent to all NE network nodes 306 (this may be carried out by functionality 500 in FIG. 5). At S2, at all NE network nodes which received the MDT privacy matrix store the MDT privacy matrix (this may be carried out by functionality 502 in FIG. 5).

Figure 4B:
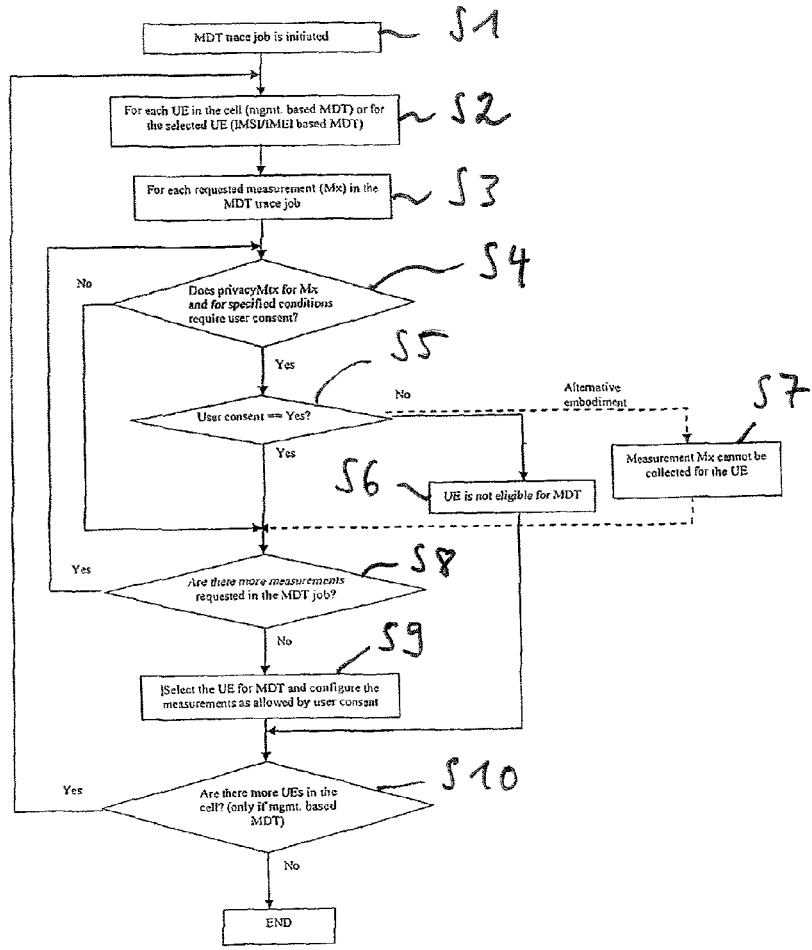

After the processes described in FIG. 4A have been carried out, the following method, as shown in FIG. 4B, may be adopted: At S1, a MDT trace job is initiated, e.g. at a NM network node 308, and a corresponding trace job request is sent to all NE network nodes 306 (this may be carried out by functionality 504 in FIG. 5). At S2, it is determined which NE network nodes 306 are addressed by the MDT trace job. Depending thereon, at S3 to S8, for each NE network node 306 addressed in the MDT trace job, the corresponding allowed MDT measurements out of the measurements requested by the MDT trace job are determined. At S4 and S5, it is determined for each measurement for an addressed UE whether a user consent is required, based on the MDT privacy matrix. If the user consent is required for a measurement according to the MDT privacy matrix, but user consent is not given by the UE, then at S6 it may be determined that the UE cannot be selected for MDT measurements in general. Alternatively, if the user consent is required for a measurement according to the MDT privacy matrix, but user consent is not given by the UE, it may be determined at S7 that only this measurement cannot be carried out for the UE, but other measurement could. At S9, the MDT measurements according to the determinations done at S4 to S8 are carried out for the UE. At S10 it is ensured that this determination is done for UEs (S2 to S10 may be carried out by functionality 506 in FIG. 5). The results of the measurements may be reported back to the NM network node 308 (this may be carried out by functionality 508 in FIG. 5), where they can be further processed (this may be carried out by functionality 510 in FIG. 5)

In an extended embodiment the privacy matrix may be extended with further parameters (of arbitrary number and kind) that can consider further aspects of the data collection, which may influence whether user consent is needed for the collection or not. For example, one important aspect of the data collection could be whether unique UE identifiers are associated with the data or whether an automated function in the network or in the OAM system collects the data (i.e., a Self Organized Network (SON) function) or the operator's staff collects the data. A SON configuration is an automated configuration in which MDT measurement data is not exposed to network operator human employees (and therefore may impose lower privacy requirements). The unique UE identifiers may include an International Mobile Subscriber Identity (IMSI) or International Mobile Equipment Identify Software Version (IMEI SV), for example.

When the MDT data may be accessible by humans (not a SON configuration), a more strict privacy policy may apply. Another aspect that may influence the need of user consent could be whether location coordinates are associated with the measurements or not. The specific privacy policy can advantageously be customized based on the local privacy laws of a country in which the MDT measurements are being recorded.

An example of the extended privacy matrix is shown below in Table 2.

TABLE 2

| MDT measurement | IMSI/IMEI(SV) collected (yes/no) | Use case (SON or operator's staff collection) | Privacy indicator (0: user consent not needed) (1: user consent needed) |
|---|---|---|---|
| M1: (RSPP/RSRQ) | no | SON | 0 |
| M1: (RSPP/RSRQ) | yes | SON | 0 |
| M1: (RSPP/RSRQ) | yes | Operator | 1 |
| M2: (SINR) | — | — | 0 |
| M3: (scheduled throughput) | — | — | 0 |
| M4: (transmitted volume) | — | — | 0 |
| M5: (GPS reporting) | — | — | 1 |
| ... | | | |

In case of the extended privacy matrix, before a NE initiates an MDT measurement collection for a particular UE, it needs to check also the further conditions of the measurement collection, i.e., whether IMSI/IMEI(SV) is associated or not and for which use the data is collected (automated SON function, another user function or operator's staff). These further conditions of the measurement collection (i.e., IMSI/IMEI(SV) presence and use case) would need to be signaled in the MDT TraceJob configuration. As shown in Table 2, there may be multiple entries in the privacy matrix for a single measurement (e.g., the multiple entries for M1) so that the various matrix criteria may be applied. The IMSI/IMEI column may indicate whether a MDT measurement collection is allowed with/without user consent when a UE identity, i.e., IMSI/IMEI is to be collected together with measurement MDT data.

During the selection process there may be two alternative embodiments for handling UEs that have not given user consent and the MDT trace job requests measurements that are subject to user consent: a UE which has not given user consent may not be selected at all for MDT, or it may be selected but with collection of only those measurements that are not subject to user consent (according to the privacy matrix). (See the two alternatives in the flow chart in FIGS. 4a-b shown as "UE is not eligible for MDT" vs. "Measurement Mx cannot be collected for the UE").

The privacy matrix may equally be applied for logged and for immediate MDT measurements, i.e., the matrix may include entries both for logged and for immediate MDT measurements.

Embodiment where Matrix is Received Via CM IRP on Itf-N

In one or more embodiments, the privacy matrix is provided as node configuration using Configuration Management (CM) over Itf-N and further propagated to the NE network node 306, according to FIG. 1. That is, the privacy matrix could be added as a new attribute to the ENBFunction Information Object Class (IOC) in 3GPP TS 32.762, to the RncFunction, to the SgsnFunction and to the MmeFunction IOCs.

The signaled privacy matrix may have either the baseline or the extended format.

| Attribute name | Support Qualifier | Read Qualifier | Write Qualifier |
|---|---|---|---|
| Id | M | M | — |
| intraANRSwitch | CM | M | M |
| iRATANRSwitch | CM | M | M |
| eNBId | M | M | — |
| x2BlackList | CM | M | M |
| x2WhiteList | CM | M | M |
| x2HOBlackList | CM | M | M |
| x2IpAddressList | O | M | — |
| tceIDMappingInfoList | CM | M | M |
| mdtPrivacyIndicatorMatrix | | | |

Similarly, the privacy matrix may be introduced as an attribute to the RncFunction IOC in 3GPP TS 32.642.

| Attribute name | Support Qualifier | Read Qualifier | Write Qualifier |
|---|---|---|---|
| id | M | M | — |
| intraANRSwitch | CM | M | M |
| iRATANRSwitch | CM | M | M |
| mcc | M | M | M |
| mnc | M | M | M |
| rncId | M | M | M |
| siptoSupported | M | M | — |
| tceIDMappingInfoList | CM | M | M |
| mdtPrivacyIndicatorMatrix | | | |

The privacy indicator attribute would need to be added to also SgsnFunction IOC and MmeFunction IOC in 3GPP TS 32.632 and in 32.752, respectively.

| Attribute name | Support Qualifier | Read Qualifier | Write Qualifier |
|---|---|---|---|
| sgsnFunctionId | + | M | M |
| userLabel | + | M | M |
| mccList | + | M | M |
| mncList | + | M | M |
| lacList | + | M | M |
| racList | + | M | M |
| sacList | + | M | M |

-continued

| | Support Qualifier | Read Qualifier | Write Qualifier |
|---|---|---|---|
| sgsnId | + | M | M |
| sgsnFunction-GsmCell | + | M | M |
| sgsnFunction-ExternalGsmCell | + | M | M |
| proceduralStatus (Note) | % | O | — |
| sgsnFunction-SgsnPool | | O | M |
| nriList | | M | M |
| mdtPrivapyIndicatorMatrix | | | |

| Attribute name | Support Qualifier | Read Qualifier | Write Qualifier |
|---|---|---|---|
| Id | M | M | — |
| pLMNIdList | M | M | — |
| mMEC | M | M | — |
| mMEPool | M | M | — |
| mdtPrivacyIndicatorMatrix | | | |

Thus, in these embodiments, the configuration of the matrix is done over Itf-N using the Basic CM IRP or Bulk CM IRP and the corresponding object defining IRPs (e.g., E-UTRAN NRM IRP, UTRAN NRM IRP, EPC NRM IRP, CN NRM IRP, etc.).

Embodiment where Matrix is Received Via Trace IRP on Itf-N

In one or more other embodiments, the privacy matrix is added over Itf-N as a new attribute e.g. to the TraceJob in TS 32.422.

In case the privacy matrix is signaled as part of the trace job, it may be sufficient to support only the baseline matrix format, since a different matrix may be signaled per job, where the scenario specific aspects of the particular data collection job can be taken into account (i.e., whether IMSI/IMEI is collected or whether operator or SON function collects the data). Thereby it becomes unnecessary to signal such scenario specific details as part of the trace job configuration.

| Attribute name | Support Qualifier |
|---|---|
| traceReference | M |
| listOfInterfaces | O |
| listOfNeTypes | CM |
| traceDepth | CM |
| traceTarget | M |
| triggeringEvent | CM |
| traceCollectionEntityAddress | M |
| jobType | M |
| listOfMeasurements | CM |
| reportingTrigger | CM |
| reportInterval | CM |
| reportAmount | CM |
| eventThreshold | CM |
| loggingInterval | CM |
| loggingDuration | CM |
| mdtAreaScope | CM |
| mdtPrivacyIndicatorMatrix | |

FIG. 5 is a block diagram of a NE network node 306 and a NM network node 308. The "NM Applications" shown in FIG. 5 could include a network operation center, connections between vendor domain managers (e.g., where different entities provide different components of a wireless communication network), etc.

Figure 6:
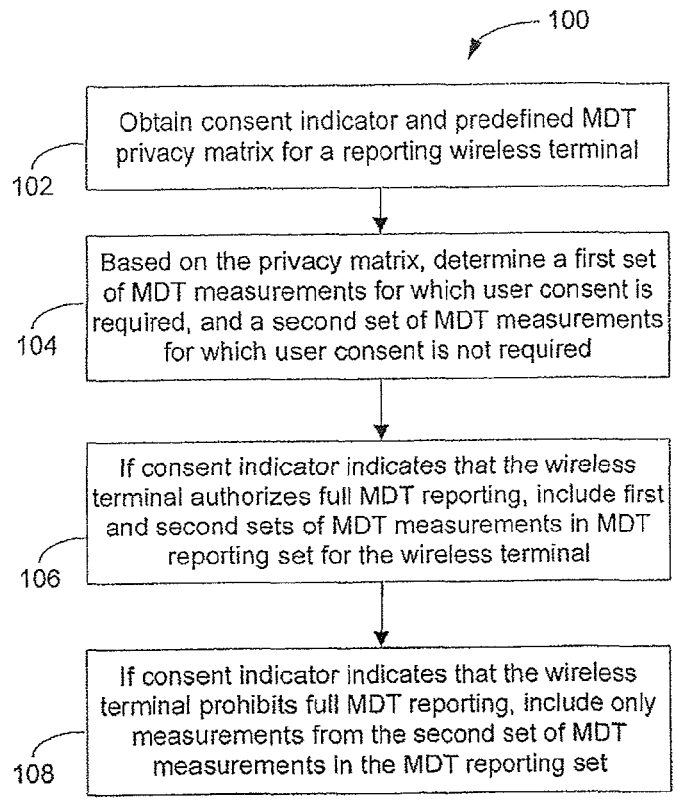
FIG. 6 illustrates an example method of reporting MDT measurements to a Network Manager node in a wireless communication network.

Referring now to FIG. 6, an exemplary method 100 of reporting MDT measurements to a Network Manager node in a wireless communication network is explained. The method 100 is implemented by a NE network node 306 or *k* Entity node. The NE network node 306 obtains a consent indicator and a predefined MDT privacy matrix for a reporting wireless terminal (block 102). Based on the privacy matrix, the NE network node 306 determines a first set of MDT measurements for which user consent is required (e.g., items in table 1 having a privacy indicator value of "1"), and a second set of MDT measurements for which user consent is not required (e.g., items in Table 1 having a privacy indicator value of "0") (block 104). Of course, as discussed above, the second set of measurements may be omitted but determinable by the NE network node 306 (e.g., by comparing the first set of measurements to a larger previously-known set of measurements).

If the consent indicator indicates that the reporting wireless terminal authorizes full MDT reporting, the first and second sets of MDT measurements are included in a MDT reporting set for the wireless terminal (block 106). If the consent indicator indicates that the reporting wireless terminal prohibits full MDT reporting, only measurements from the second set of MDT measurements are included in the MDT reporting set (block 108).

Figure 7:
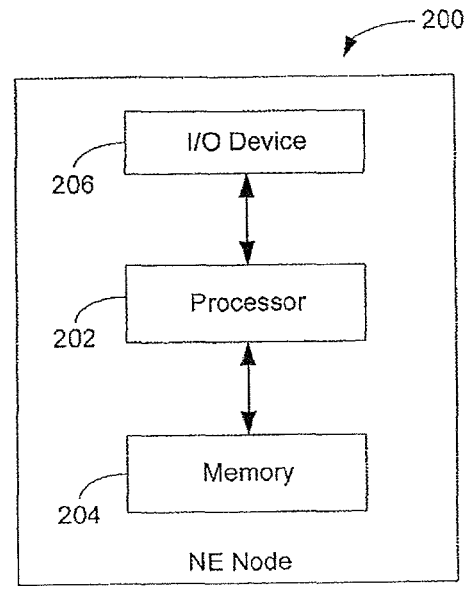
FIG. 7 illustrates the hardware of an example NE network node.

A corresponding NE network node 200 operative to implement the method 100 is also disclosed in FIG. 7. The NE network node 200 includes a processor 202, memory 204, and an input/output (I/O) device 206. The processor 202 includes one or more processor circuits configured to implement the method 100 and optionally the other methods described above and illustrated in the drawings. The one or more processing circuits may include, for example, one or more microprocessors, microcontrollers, digital signal processors, or the like. The memory 204 may be used to store program code to implement the method 100 (and/or the other methods described above). The I/O device 206 may include a transceiver for communicating with other nodes (e.g., the NM node). Method 100 may also be implemented by NE network node 306.

Figure 8:
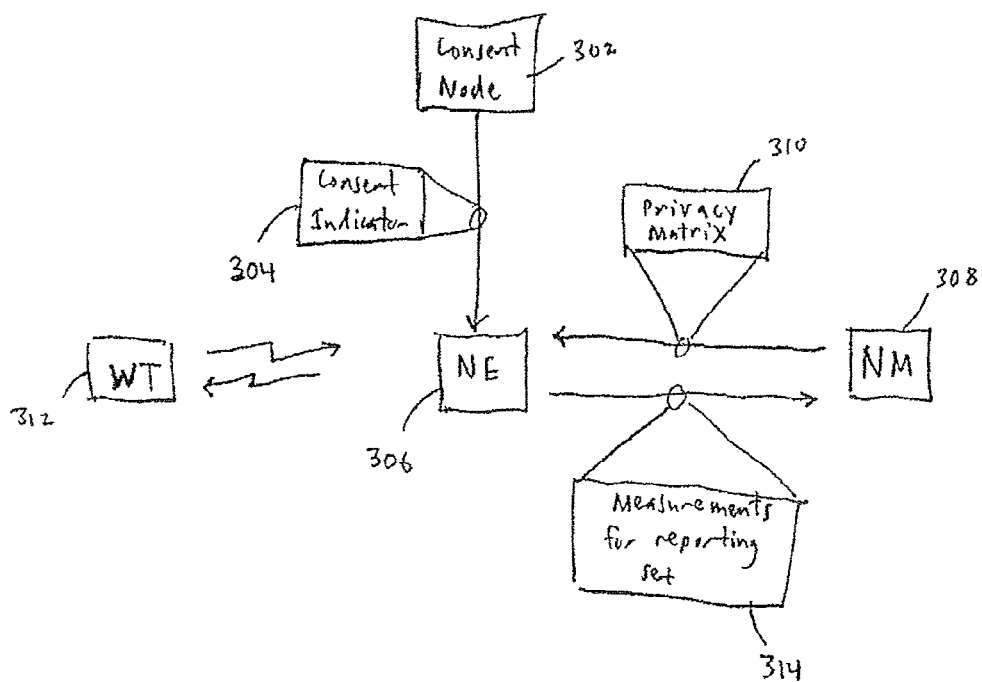
FIG. 8 illustrates an implementation of the method of FIG. 6.

FIG. 8 illustrates an implementation of the method 100 of FIG. 6. A consent node 302 (e.g. HLR or HSS) provides a consent indicator 304 to NE network node 306. A NM network node 308 provides a privacy matrix 310 to the NE network node 306. Using the consent indicator 304 and privacy matrix 310 the NE network node 306 determines a measurement set for the wireless terminal (WT) 312. Based on communications with a wireless terminal 312 (e.g., a User Equipment "UE," smartphone, laptop, etc.), the NE network node 306 records measurements 314 for the wireless terminal 312 and sends those measurements 314 to the NM network node 308. Notably, the proposed method 100 and the privacy matrix can be applied to any MDT measurements, both those that are measured and reported form the wireless terminal and also for those that are measured in the network (e.g., in the NE network node). Thus, although some measurements may be received from the wireless terminal, some MDT measurements may not require any wireless terminal involvement.

The embodiments described above advantageously enable the implementation of any privacy management policy in an operator's network with regards to collection of MDT data. Thereby it becomes possible to consider the type of data that is collected, the use case for which the data is collected, the country specific and operator specific data privacy policies. The solution provides a backward compatible extension (i.e., the one bit user consent indicator is preserved and extended with the privacy matrix).

Configuring the privacy matrix may be optional, meaning that when no privacy matrix is given, or in case entries for some measurements are missing from the privacy matrix, a default interpretation may apply. The default interpretation may be that when no privacy matrix is given or when entries for some measurements are missing from the privacy matrix, the interpretation should be that no user consent applies (i.e., the corresponding measurements can be collected without user consent). Alternatively, the default interpretation may be that for cases not specified in the privacy matrix user consent should apply (i.e., the corresponding measurement can be collected only when user consent is available).

When such a default interpretation exists then it is enough to include only those measurements in the privacy matrix that should not be handled via the default interpretation (e.g., if the default interpretation is that no user consent is needed, then it is sufficient to include only those measurements which require user consent). Thereby it is possible to decrease the size of the privacy indicator and the amount of configuration data that needs to be signaled.

According to the embodiments described above, MDT data collection can be flexibly customized based on different requirements and laws in different countries.

A further advantage of one or more embodiments is that a user has to give only one yes/no indication, i.e., he/she does not have to understand the specific details of the measurements. It is the operator's responsibility to translate that consent indication to actual measurement collection with the configuration of the privacy matrix.

Thus, the foregoing description and the accompanying drawings represent non-limiting examples of the methods and apparatus taught herein. As such, the present invention is not limited by the foregoing description and accompanying drawings. Instead, the present invention is limited only by the following claims and their legal equivalents.

The privacy matrix as described herein may be extended with one or more further dimensions/columns specifying on or more further conditions under which MDT data may be collected with/without user consent. So, if any new aspects come up in the future, upon which the allowance of MDT data collection would need to be conditioned, this aspect/condition may be added as a new dimension/column in the privacy matrix.

Additional information on one or more embodiments of the present disclosure may be found in the attached appendices "A" and "B."

The invention claimed is:

1. A method of operating a Network Element (NE) network node of a communication network, the NE network node being connected via the communication network to at least one user device, the method comprising:
receiving a request at the NE network node to carry out a Minimization of Drive Testing (MDT) measurement for one of the at least one user device;
determining, at the NE network node, whether carrying out the MDT measurement or processing or reporting a result of the MDT measurement requires a user consent, based on data of an MDT privacy matrix, wherein each MDT measurement entry of the MDT privacy matrix comprises the following data units:
information specifying how the MDT measurement is to be carried out; and
information specifying how the collected data is intended to be used or processed;
determining, at the NE network node, whether a consent indicator that is assigned to the user device indicates allowance to carry out the MDT measurement, or indicates allowance of processing or reporting the result of the MDT measurement, if the MDT privacy matrix indicates that a user consent is necessary; and
carrying out the MDT measurement at the NE network node, processing the result of the MDT measurement, and/or reporting the result of the MDT measurement to a further network node of the communication network if the consent indicator indicates that the MDT measurement can be carried out or that the result of the MDT measurement can be processed or reported.

2. The method according to claim 1, the method further comprising:
not carrying out the MDT measurement, or carrying out the MDT measurement, but not processing or reporting a result of the MDT measurement to the further network node, if the consent indicator indicates that the MDT measurement cannot be carried out or that the result of the MDT measurement cannot be processed or reported.

3. The method according to claim 1, comprising:
receiving a request at the NE network node to carry out a plurality of MDT measurements for the user device;
based on the MDT privacy matrix, determining a first set of MDT measurements for which user consent is required, and a second set of MDT measurements for which user consent is not required;
including, if the consent indicator indicates that the user device user allows to carry out MDT measurements and to process/report a result of the MDT measurements, the first set and the second set of MDT measurements into an MDT reporting set assigned to the user device;
including, if the consent indicator indicates that the user device user does not allow to carry out MDT measurements or does not allow to process/report the result of the MDT measurements, only the second set of MDT measurements in the MDT reporting set; and
transmitting the MDT reporting set to the further network node.

4. The method according to claim 1,
wherein the MDT privacy matrix comprises at least one pair of an MDT measurement entry that indicates an MDT measurement to be carried out, and a consent indicator entry that indicates whether the MDT measurement requires a user consent or not.

5. The method according to claim 1,
wherein the consent indicator assigned to the user device is transferred from a consent network node storing consent indicators for the at least one user device to the NE network node, or is transferred from the user device to the NE network node.

6. The method according to claim 1,
wherein the user device is a wireless terminal wirelessly connected to the NE network node.

7. The method according to claim 1,
wherein the communication network comprises at least one Network Manager (NM) network node and at least one Domain Manager (DM) network node, wherein the at least one NM network node is connected to the at least one DM network node, and the at least one DM network node is connected to the NE network node.

8. The method according to claim 7, wherein the MDT privacy matrix is transferred from one of the at least one NM network nodes to the NE network node.

9. The method according to claim 7,
wherein the result of the MDT measurement is sent from the NE network node to the NM network node.

10. The method according to claim 7,
wherein the MDT privacy matrix is transferred from one of the at least one NM network node to the NE network node via one of the at least one DM network node, and wherein the result of the MDT measurement is sent from the NE network node to the NM network node via one of the at least one DM network node.

11. The method according to claim 7,
wherein the MDT privacy matrix is provided from the NM network node to the NE network node via an Itf interface and during a configuration process of the NE network node using Configuration Management IRP.

12. The method according to claim 11,
wherein the MDT privacy matrix is provided as a part of ENBFunction Information Object Class (IOC) information, a RncFunction IOC information, a SgsnFunction IOC information, or a MmeFunction IOC information that is transferred from the NM network node to the NE network node via the Itf interface, respectively.

13. The method according to claim 7,
wherein the MDT privacy matrix is provided from the NM network node to the NE network node via an Itf interface and as a part of the request received at the NE network node to carry out the MDT measurement using Trace Integration Reference Points (IRP).

14. A method of operating a Network Manager (NM) network node of a communication network, the network node being connected via the communication network to a Network Element (NE) network node, the NE network node being connected to at least one user device, the method comprising:
receiving or generating, at the NM network node, a Minimization of Drive Testing (MDT) privacy matrix indicating whether carrying out an MDT measurement or processing or reporting a result of the MDT measurement for a user device requires a user consent, wherein each MDT measurement entry of the MDT privacy matrix comprises the following data units:
information specifying how the MDT measurement is to be carried out; and
information specifying how the collected data is intended to be used or processed;
transmitting the MDT privacy matrix to the NE network node; and
receiving MDT measurement data for the user device collected by the NE network node based on data of the MDT privacy matrix and based on a consent indicator assigned to the user device that indicates allowance to carry out the MDT measurement, and/or indicates allowance of processing or reporting the result of the MDT measurement to the NM network node.

15. A method of operating a communication network comprising a Network Manager (NM) network node and a Network Element (NE) network node, the NM network node being connected via the communication network to the NE network node, and the NE network node being connected to at least one user device, the method comprising:
receiving or generating, at the NM network node, a Minimization of Drive Testing (MDT) privacy matrix indicating whether carrying out an MDT measurement or processing or reporting a result of the MDT measurement for one of the at least one user devices requires a user consent, wherein each MDT measurement entry of the MDT privacy matrix comprises the following data units:
information specifying how the MDT measurement is to be carried out; and
information specifying how the collected data is intended to be used or processed;
transmitting the MDT privacy matrix to the NE network node;
receiving a request at the NE network node to carry out an MDT measurement for one of the at least one user device;
determining, at the NE network node, whether carrying out the MDT measurement or processing or reporting a result of the MDT measurement requires a user consent, based on data of the MDT privacy matrix;
determining, at the NE network node, whether a consent indicator that is assigned to the user device indicates allowance to carry out the MDT measurement, or indicates allowance of processing or reporting the result of the MDT measurement, if the MDT privacy matrix indicates that a user consent is necessary; and
carrying out the MDT measurement at the NE network node, processing the result of the MDT measurement, and/or reporting the result of the MDT measurement to the NM network node, if the consent indicator indicates that the MDT measurement can be carried out or the result of the MDT measurement can be processed or reported.

16. The method according to claim 15, the method further comprising:
not carrying out the MDT measurement, or carrying out the MDT measurement, but not processing or reporting a result of the MDT measurement to the NM network node, if the consent indicator indicates that the MDT measurement cannot be carried out or that the result of the MDT measurement cannot be processed or reported.

17. The method according to claim 15, comprising:
receiving a request at the NE network node to carry out a plurality of MDT measurements for the user device;
based on the MDT privacy matrix, determining a first set of MDT measurements for which user consent is required, and a second set of MDT measurements for which user consent is not required;
including, if the consent indicator indicates that the user device user allows to carry out MDT measurements and to process/report a result of the MDT measurements, the first set and the second set of MDT measurements into an MDT reporting set assigned to the user device;
including, if the consent indicator indicates that the user device user does not allow to carry out MDT measurements or does not allow to process/report the result of the MDT measurements, only the second set of MDT measurements the MDT reporting set; and
transmitting the MDT reporting set to the NM network node.

18. A non-transitory computer readable storage medium storing a computer program comprising program code portions that, when executed on a processing circuit of a Network Element (NE) network node connected via a communication network to at least one user device, cause the processing circuit to:
receive a request at the NE network node to carry out a Minimization of Drive Testing (MDT) measurement for one of the at least one user device;
determine, at the NE network node, whether carrying out the MDT measurement or processing or reporting a result of the MDT measurement requires a user consent, based on data of an MDT privacy matrix, wherein each MDT measurement entry of the MDT privacy matrix comprises the following data units:
information specifying how the MDT measurement is to be carried out; and
information specifying how the collected data is intended to be used or processed;
determine, at the NE network node, whether a consent indicator that is assigned to the user device indicates allowance to carry out the MDT measurement, or indicates allowance of processing or reporting the result of the MDT measurement, if the MDT privacy matrix indicates that a user consent is necessary; and carry out the MDT measurement at the NE network node, process the result of the MDT measurement, and/or report the result of the MDT measurement to a further network node of the communication network if the consent indicator indicates that the MDT measurement can be carried out or the result of the MDT measurement can be processed or reported.

19. A non-transitory computer readable storage medium storing a computer program comprising program code portions that, when executed on a processing circuit of a Network Manager (NM) network node connected via a communication network to a Network Element (NE) network node that is connected to at least one user device, cause the processing circuit to:

receive or generate, at the NM network node, a Minimization of Drive Testing (MDT) privacy matrix indicating whether carrying out an MDT measurement or processing or reporting a result of the MDT measurement for a user device requires a user consent, wherein each MDT measurement entry of the MDT privacy matrix comprises the following data units:
information specifying how the MDT measurement is to be carried out; and
information specifying how the collected data is intended to be used or processed;

transmit the MDT privacy matrix to the NE network node; and receive MDT measurement data for the user device collected by the NE network node based on data of the MDT privacy matrix and based on a consent indicator assigned to the user device that indicates allowance to carry out the MDT measurement, and/or indicates allowance of processing or reporting the result of the MDT measurement to the NM network node.

20. A Network Element (NE) network node of a communication network, the network node being connectable via the communication network to at least one user device, the NE network node comprising:

a receiving unit configured to receive a request at the NE network node to carry out a Minimization of Drive Testing (MDT) measurement for one of the at least one user device;

a processing unit connected to the receiving unit and configured to determine whether carrying out the MDT measurement or processing or reporting a result of the MDT measurement requires a user consent, based on data of an MDT privacy matrix, the processing unit being configured to determine whether a consent indicator that is assigned to the user device indicates allowance to carry out the MDT measurement, or indicates allowance of processing or reporting the result of the MDT measurement if the MDT privacy matrix indicates that a user consent is necessary, wherein each MDT measurement entry of the MDT privacy matrix comprises the following data units:
information specifying how the MDT measurement is to be carried out; and
information specifying how the collected data is intended to be used or processed;

a measurement unit connected to the processing unit and configured to carry out the MDT measurement, process the result of the MDT measurement, and/or report the result of the MDT measurement to a further network node of the communication network if the consent indicator indicates that the MDT measurement can be carried out or the result of the MDT measurement can be processed or reported; and a sending unit configured to send the result of the MDT measurement to the further network node of the communication network.

21. The NE network node according to claim 20,
the measurement unit being further configured to not carry out the MDT measurement, or carry out the MDT measurement, but not process or report a result of the MDT measurement to the further network node, if the consent indicator indicates that the MDT measurement cannot be carried out or that the result of the MDT measurement cannot be processed or reported.

22. A Network Manager (NM) network node of a communication network, the network node being connectable via the communication network to a Network Element (NE) network node, the NM network node comprising:

a transmitting unit configured to transmit a Minimization of Drive Testing (MDT) privacy matrix generated or received at the NM network node to the NE network node, the MDT privacy matrix indicating whether carrying out an MDT measurement or processing or reporting a result of the MDT measurement for a user device requires a user consent, wherein each MDT measurement entry of the MDT privacy matrix comprises the following data units:
information specifying how the MDT measurement is to be carried out; and
information specifying how the collected data is intended to be used or processed; and a receiving unit configured to receive MDT measurement data for the user device collected by the NE network node based on data of the MDT privacy matrix and based on a consent indicator assigned to the user device that indicates allowance to carry out the MDT measurement, and/or indicates allowance of processing or reporting the result of the MDT measurement to the NM network node.

* * * * *

UNITED STATES PATENT AND TRADEMARK OFFICE
CERTIFICATE OF CORRECTION

PATENT NO.        : 9,167,461 B2
APPLICATION NO.   : 14/431795
DATED             : October 20, 2015
INVENTOR(S)       : Rácz et al.

It is certified that error appears in the above-identified patent and that said Letters Patent is hereby corrected as shown below:

On the title page item (73), delete "Ericcson" and insert -- Ericsson --, therefor.

In the specification

Column 1, Line 50, delete "Horne" and insert -- Home --, therefor.

Column 13, Table, Line 8, delete "Privapy" and insert -- Privacy --, therefor.

Signed and Sealed this
Twenty-sixth Day of July, 2016

Michelle K. Lee
*Director of the United States Patent and Trademark Office*